United States Patent Office 2,748,013
Patented May 29, 1956

2,748,013

PETROLEUM MICROCRYSTALLINE WAX COATING COMPOSITION

William B. Watson, Park Forest, Ill., assignor to Sinclair Refining Company, New York, N. Y., a corporation of Maine No Drawing. Application June 5, 1953, Serial No. 359,969

8 Claims. (Cl. 106—270)

My invention relates to the production of novel compositions of an air blown mixture of aromatic petroleum oil and a petroleum microcrystalline wax useful as materials for the coating of buried metal surfaces, particularly underground pipe lines.

Buried metal surfaces, particularly underground pipe lines such as petroleum crude, petroleum products, gas and water lines, are subject to severe corrosion from contact with moisture and from the occurrence of electrolytic cells with the metal surface. Coatings, such as asphalt or coal tar base paints, are widely used to protect these surfaces from this corrosion. Many coating materials, however, are not sufficiently impervious to air and moisture or sufficiently non-conductive to electrical currents to prevent serious corrosion from these sources. Moreover, many materials do not have sufficient resistance to shattering or chipping, or sufficient hardness to resist soil abrasion or sufficient dimensional stability and adherence to the metal surface under temperature conditions of use to keep the metal surface completely protected. In some instances shields of reinforced concrete are applied to the pipe line.

I have found that air-blown mixtures of aromatic petroleum oils and microcrystalline wax, including petrolatum, have special value for coatings for buried metal surfaces. The resulting compositions provide low cost coating materials for buried metal surfaces which effectively prevent corrosion of the metal. The coating compositions are relatively impervious to air and moisture and are non-conductors of electricity. Moreover, the compositions have good resistance to shattering or chipping, good dimensional stability and good adherence under temperature conditions of use. The compositions resist deterioration by petroleum oils, vegetable and animal greases and other solvents. They are easily applied at relatively low temperatures, for example, about 350 to 450° F., do not emit obnoxious odors or fumes in their molten state and have no deleterious effect upon the metal to which they are applied. The compositions have good flexibility and will not break under normal flexure and are easily renewable if the surface becomes broken by accident or otherwise.

The aromatic petroleum oil component of my coating composition includes extracts from solvent treating, for example, with phenol, furfural, nitrobenzene and the like, of raw lubricating oil stocks, wax tailings from coking processes and heavy cycle oils from catalytic or thermal cracking processes. The aromatic oil should contain a maximum of about 50 weight per cent of paraffinic and naphthenic molecules as determined by silica gel adsorption and its viscosity index should be less than about 40. Preferably, the oil should have a minimum Saybolt universal viscosity at 210° F. of about 100 seconds.

The wax component of my coating composition is microcrystalline wax or wax fraction, preferably having a minimum Saybolt universal viscosity at 210° F. of about 45 seconds. Advantageously, the microcrystalline wax may be employed in the form of petrolatum. These stocks are the solid hydrocarbon mixtures that are separated from heavy petroleum distillates and residues by conventional dewaxing processes.

The coating composition is produced by air-blowing a mixture of the aromatic oil and wax at an elevated temperature. An air blowing rate of about 0.01 to 5 per cubic feet per pound per hour is a satisfactory practical operating range. The reaction rate can be increased by increasing the air rate. Temperatures of about 400° to 600° F. are preferred for practical operating temperatures. The reaction is very slow below about 400° F. and the upper temperature is limited by the flash point of the charge stock. The reaction rate increases as the temperature is raised and in some instances the penetration of the finished coating can be varied slightly by varying the air-blowing temperature, that is, a harder product can be produced by using a higher temperature. The process may be operated with or without a catalyst. Conventional air-blowing catalysts such as boric acid, iron naphthenate, ferric chloride or phosphorus pentoxide can be employed if desired. Surprisingly, I have found that the aromatic oil and wax must be air blown as a mixture to produce a satisfactory coating composition. Blowing the components separately and then blending the air-blown components results in unsatisfactory products which produce coatings of poor homogeneity, poor flexibility and high solubility in petroleum oils.

The exact proportions of the components of the mixture depend upon the characteristics desired in the finished coating, the degree of aromaticity and the viscosity of the aromatic oil and the penetration hardness of the microcrystalline wax or petrolatum. Concerning the characteristics desired in the finished coating, increasing the wax content improves flexibility and shatter resistance at both high and low climatic temperatures but soil abrasion resistance and insolubility in petroleum oils are decreased because of the decrease in aromatic oil content. Also, the wax component provides a low molten viscosity and a reduced tendency for cold flow in the product. Concerning the aromaticity of the aromatic oil, as the aromaticity of the oil increases the content of wax must be increased in order to obtain a coating with desirable flexibility and shatter resistant properties. Also, as the viscosity of the aromatic oil decreases it becomes less compatible with the wax component and in some cases this lack of compatibility limits the percentage of the wax component. Concerning the penetration of the microcrystalline wax or petrolatum, the flexibility and shatter resistance vary inversely with the penetration of the wax component and therefore larger percentages of the harder waxes must be added to obtain a desirable coating. In general the coating compositions should contain between about 3 and 50 weight per cent of the wax component. A particularly advantageous composition is produced by air blowing a mixture of about 75 per cent of an aromatic oil and about 25 per cent of microcrystalline wax or petrolatum.

Various fillers may be added to the coating compositions if desired. Suitable fillers include powdered talc, rock powder, micro-asbestos and ground mica. Fillers such as talc improve shatter resistance and soil abrasion resistance.

The preparation and properties of the coating compositions of my invention will be further illustrated by the following example:

A mixture of an aromatic petroleum oil and a microcrystalline wax in the form of petrolatum was air-blown at an elevated temperature and the product tested for softening point, needle penetration, oil solubility and water adsorption.

75 weight per cent of a lubricating oil extract was mixed with 25 weight per cent of petrolatum. The oil has an A. P. I. gravity of 11.5, a flash point of 510° F., a viscosity of 60,000 SUS at 100° F. and 405 SUS at 210° F. a viscosity index of —71, an aniline point of 48.3° C. and a refractive index of 1.54365 at 70° C. By means of silica gel adsorption it was determined that the oil contained 26 weight per cent paraffins and naphthenes and 74 weight per cent aromatics and had a refractive index of paraffins and naphthenes of 1.49490 of 70° C. and a refractive index of aromatics of 1.56400 at 70° C. The petrolatum had an A. P. I. gravity of 33.6, a flash point of 515° F., a melting point of 151.5° F., 2.7 weight per cent oil and a needle penetration of 66 at 77° F.

The mixture of aromatic oil and petrolatum was air-blown at 475° F. for 18 hours at an air rate of 3.3 cubic feet per hour per pound. The resulting product had a specific gravity of 1.0149 at 77° F./77° F., a needle penetration of 11 at 77° F. and 21 at 115° F., a softening point (ring and ball) of 231° F., a water adsorption in milligrams per 40 square centimeters of 6.2 after 7 days, 11.0 after 21 days and 13.5 after 40 days, a minimum flexibility of 60° F., 0.0 per cent ash, 36.1 per cent insolubles (ash free basis) in 86° naphtha and 23.8 per cent in kerosene, a viscosity of 160 cps. at 400° F. and 490 cps. at 350° F. Also, the product passed the falling ball shatter test at 3 feet and shattered at 5 feet.

To meet the requirements of coating compositions for materials such as buried pipe lines a satisfactory coating composition must meet a combination of difficult to obtain specifications. For example, it is important for easy applicability, good soil abrasion resistance, good water resistance and good resistance to deterioration by petroleum oils that the compositions have a softening point (ring and ball) of about 175 to 350° F., a needle penetration of about 2 to 25 at 77° F., a maximum water adsorption (40 days) of about 20.0 milligrams per 40 square centimeters and a minimum insolubility of about 25 per cent in 86° naphtha and about 15 per cent in kerosene. In addition, the material must be flexible, must not exhibit cold flow at normal atmospheric conditions, must resist shattering, must be a non-conductor of electricity, must have no deleterious effect upon the metal to which it is applied and must be easily renewable.

The test results on the composition produced as described above show that it fully meets these specifications and requirements. At the same time the composition is produced from materials which are readily available and relatively inexpensive.

I claim:
1. A coating composition which essentially comprises an air-blown mixture of an aromatic petroleum oil and about 3 to 50 weight per cent of a petroleum microcrystalline wax.

2. The composition of claim 1 which the microcrystalline wax is in the form of petrolatum.

3. A coating composition which essentially comprises an air-blown mixture of an aromatic petroleum oil which contains not more than about 50 weight per cent of paraffinic and naphthenic molecules as determined by silica gel adsorption and which has a viscosity index of less than about 40 and a Saybolt universal viscosity at 210° F. of not less than about 100 seconds and about 3 to 50 weight per cent of a petroleum microcrystalline wax having a Saybolt universal viscosity at 210° F. of not less than about 45 seconds.

4. The composition of claim 3 in which the microcrystalline wax is in the form of petrolatum.

5. The method of manufacturing a coating composition which comprises mixing an aromatic petroleum oil and about 3 to 50 weight per cent of a petroleum microcrystalline wax and introducing air into the resulting mixture while maintaining the mixture at an elevated temperature.

6. The method of claim 5 in which the microcrystalline wax is in the form of petrolatum.

7. The method of manufacturing a coating composition which comprises mixing an aromatic petroleum oil which contains not more than about 50 weight per cent of paraffinic and naphthenic molecules as determined by silica gel adsorption and which has a viscosity index of less than about 40 and a Saybolt universal viscosity at 210° F. of not less than about 100 seconds and about 3 to 50 weight per cent of a petroleum microcrystalline wax having a Saybolt universal viscosity at 210° F. of not less than about 45 seconds and introducing air into the resulting mixture while maintaining the mixture at a temperature of about 400° to 600° F.

8. The method of claim 7 in which the microcrystalline wax is in the form of petrolatum.

References Cited in the file of this patent
UNITED STATES PATENTS

| | | |
|---|---|---|
| 2,156,266 | Murphree et al. | May 2, 1939 |
| 2,583,938 | French | Jan. 29, 1952 |
| 2,634,677 | Klimkowsky et al. | Apr. 14, 1953 |
| 2,640,809 | Nelson | June 2, 1953 |